US012723465B2

(12) United States Patent
Sohn et al.

(10) Patent No.: US 12,723,465 B2
(45) Date of Patent: Sep. 1, 2026

(54) METHOD FOR CHANGING BUILDING ENVELOPE FUNCTION

(71) Applicant: SAMOO ARCHITECTS & ENGINEERS CO., LTD, Seoul (KR)

(72) Inventors: Chang Kyu Sohn, Seoul (KR); Dong Hoon Kim, Hanam-si (KR); Ju Byung Lee, Yongin-si (KR); Shin Jae Lee, Seoul (KR); Ha Won Yoon, Seoul (KR); Dae Soon Kim, Seoul (KR); Jun Young Yang, Seoul (KR); Guen Il Huh, Seoul (KR); Jun Yub Kim, Seoul (KR); Sang Eun Han, Seoul (KR)

(73) Assignee: SAMOO ARCHITECTS & ENGINEERS CO., LTD, Seoul (KR)

( * ) Notice: Subject to any disclaimer, the term of this patent is extended or adjusted under 35 U.S.C. 154(b) by 111 days.

(21) Appl. No.: 18/866,325

(22) PCT Filed: Jan. 30, 2024

(86) PCT No.: PCT/KR2024/001411
§ 371 (c)(1),
(2) Date: Nov. 15, 2024

(87) PCT Pub. No.: WO2024/219606
PCT Pub. Date: Oct. 24, 2024

(65) Prior Publication Data

US 2025/0314064 A1 Oct. 9, 2025

(30) Foreign Application Priority Data

Apr. 17, 2023 (KR) ........................ 10-2023-0050291
May 31, 2023 (KR) ........................ 10-2023-0069952

(51) Int. Cl.
*E06B 9/36* (2006.01)
*E04B 2/88* (2006.01)
(Continued)

(52) U.S. Cl.
CPC ................ *E06B 9/367* (2013.01); *E04B 2/88* (2013.01); *E04B 2/90* (2013.01); *E04F 10/10* (2013.01);
(Continued)

(58) Field of Classification Search
CPC ...... E04B 1/34331; E04B 1/3431; E04B 2/88; E04B 2/90; E04B 2001/3572; E06B 9/361; E06B 9/368
See application file for complete search history.

(56) References Cited

U.S. PATENT DOCUMENTS 1,238,297 A * 8/1917 Johanson .............. E04B 1/3431 160/90
5,184,440 A * 2/1993 Felix ..................... E06B 3/5427 52/235
(Continued)

FOREIGN PATENT DOCUMENTS

DE 19911490 A1 * 8/2000 ............. E04B 7/163
FR 2387329 A1 * 4/1977
(Continued)

*Primary Examiner* — Christine T Cajilig
(74) *Attorney, Agent, or Firm* — Rabin & Berdo, P.C.

(57) ABSTRACT

The present invention relates to a method for changing the envelope structure of a building to improve functions or facilitate modifying same of a building in accordance with user requests without any reduction to the usable interior space of the building, the method comprising the steps of: a) separating, from an exterior structure, the target exterior enclosure the function of which is to be changed; b) sliding and pulling out the target exterior enclosure, like a drawer, along a guide frame to the outside of the exterior structure; (c) removing a cartridge inside the target exterior enclosure and inserting a cartridge having a new function; and (d) inserting the target exterior enclosure back into the exterior
(Continued)

structure by sliding the target exterior enclosure, like a drawer, along the guide panel.

5 Claims, 12 Drawing Sheets

(51) Int. Cl.
*E04B 2/90* (2006.01)
*E04F 10/10* (2006.01)
*E06B 7/084* (2006.01)

(52) U.S. Cl.
CPC ................ *E06B 7/084* (2013.01); *E06B 9/36* (2013.01); *E06B 9/361* (2013.01); *E06B 9/368* (2013.01)

(56) References Cited

U.S. PATENT DOCUMENTS

| | | | | |
|---|---|---|---|---|
| 2019/0071860 | A1* | 3/2019 | Yabushita | E04B 2/707 |
| 2021/0262230 | A1* | 8/2021 | Golan | E04C 2/46 |

FOREIGN PATENT DOCUMENTS

| | | | | |
|---|---|---|---|---|
| JP | H11-336233 | A | 12/1999 | |
| JP | 2004-285820 | A | 10/2004 | |
| KR | 10-1650811 | B1 | 9/2016 | |
| KR | 10-2025822 | B1 | 9/2019 | |
| KR | 10-2022-0131738 | A | 9/2022 | |
| KR | 10-2627040 | B1 | 1/2024 | |
| KR | 10-2627041 | B1 | 1/2024 | |
| WO | WO-2015051545 | A1 * | 4/2015 | E04B 2/90 |

* cited by examiner (a)

(b)

METHOD FOR CHANGING BUILDING ENVELOPE FUNCTION

TECHNICAL FIELD

The present invention relates to a method for changing a building envelope function, which can enhance or easily change the function of a building according to a user's needs without reducing the internal usage space of the building, thereby increasing the durability of the building.

BACKGROUND ART

Recently, due to the increased economic uncertainty, the interest rate hikes, and the increase of raw material prices and construction costs, the development of new buildings has been stagnant. Meanwhile, the growth industries, such as ICT industry based on new technologies related to the fourth industrial revolution technology are increasing demands for environmentally friendly architectural spaces evolving in consideration of users.

However, facilities supporting each space within a building are typically installed around the core. Thus, if there is a need to add functions to the building according to the user's needs and expand the facilities, the core must be expanded, which necessitates indoor construction, so it is difficult to use the building during the construction period and available spaces in the building are reduced.

On the other hand, Korean Patent No. 1650811 discloses an energy-saving envelope ventilation structure of a renovated building, in which an opening and closing member (awning, or louver) is installed on a hollow layer (vent) of a double envelope of a building to prevent loss of indoor energy and provide occupants with pleasant surroundings, thereby enhancing functions of the building.

The envelope structure disclosed in Korean Patent No. 1650811 includes an inner window located on the outer surface, an outer fixing window installed to be spaced apart from the inner window at a predetermined distance, an upper opening and closing window installed above the outer fixing window at the ceiling level of each floor to be openable, and a lower opening and closing window installed below the outer fixing window to be openable, saving energy of the building using a double space between the inner window and the outer fixing window. However, the envelope structure cannot cope with users' various demands for functional enhancement of buildings.

DISCLOSURE

Technical Problem

Accordingly, the present invention has been made in view of the above-mentioned problems occurring in the related art, and it is an object of the present invention to provide a a multipurpose envelope structure of a building and a method for changing a building envelope function using the same, which can simplify work for adjustment of space environment according to building users' needs, do not hinder the use of the building even during the work to allow the users to continue business, and do not reduce the user's space in the building even if facilities for function enhancement are added.

Technical Solution

To accomplish the above-mentioned objects, according to the present invention, there is provided a building envelope structure including: a support frame installed on a structure of a building; a guide frame protruding outwardly from the support frame; and an exterior enclosure forming the exterior of the building and installed on the guide frame in a drawer-like manner.

In an embodiment, the guide frame includes a pair of vertical guide members which are spaced apart from each other, a connection bar which connects the pair of vertical guide members from the rear, and an exterior strip which is installed in front of the vertical guide members.

In an embodiment, the exterior enclosure includes an exterior frame on which a finish panel is installed, a fixed frame located behind the exterior frame, and a connection frame which connects the exterior frame and the fixed frame, is coupled to the adjacent exterior enclosure to be detachable, and has an insertion opening.

In another embodiment of the present invention, a method for changing the function using the building envelope structure includes the steps of: a) detaching, from an exterior structure, a target exterior enclosure to be changed in function; b) sliding the target exterior enclosure on a guide frame and extracting out of the exterior structure in a drawer-like manner; c) removing a cartridge inside the target exterior enclosure and inserting a new cartridge having a new function; and d) sliding the target exterior enclosure on a guide panel to insert into the exterior structure in the drawer-like manner and inserting the target exterior enclosure back into the exterior structure by sliding the target exterior enclosure, like a drawer, along the guide panel, and performs the steps in sequence.

In this instance, in another embodiment of the present invention, the step b) includes: placing a temporary enclosure in front of the target exterior enclosure to be extracted, and inserting the target exterior enclosure into the temporary enclosure. For this, the temporary enclosure includes: vertical bars which are installed at each corner of a rectangular cross-section which can accommodate the target exterior enclosure; a bottom frame which integrates the vertical bars and supports the positioned target exterior enclosure; and a U-shaped separation prevention frame which connects between the vertical bars excepting between the pair of vertical bars located inside, thus forming a U-shaped configuration.

Advantageous Effect

The present invention allows the building's functionality or indoor environment to be easily changed or enhanced according to users' needs, thus maximizing the utility of the building. Especially, in performing equipment construction work, a portion of the building envelope is formed to be extracted and inserted in the drawer-like manner and the construction work does not need construction work for the core part. Accordingly, the present invention enables the user to use the building even during the construction period, does not cause business interruption, does not reduce the usable indoor space, and can remove unreasonable mechanical units occupying available spaces, thereby expanding a usable indoor space, minimizing the construction period, and enhancing economic efficiency.

BEST MODE

In the most preferred embodiment of the present invention, a method for changing the function using the building envelope structure includes the steps of: a) detaching, from an exterior structure, a target exterior enclosure to be changed in function; b) sliding the target exterior enclosure on a guide frame and extracting out of the exterior structure in a drawer-like manner; c) removing a cartridge inside the target exterior enclosure and inserting a new cartridge having a new function; and d) sliding the target exterior enclosure on a guide panel to insert into the exterior structure in the drawer-like manner and inserting the target exterior enclosure back into the exterior structure by sliding the target exterior enclosure, like a drawer, along the guide panel, and performs the steps in sequence, thereby replacing, adding or removing cartridges while extracting the exterior enclosure from a structure of a building in the drawer-like manner.

MODE FOR INVENTION

Hereinafter, the most preferred embodiment of the present invention will be described in detail with reference to the accompanying drawings. However, in describing the present invention, detailed description of relevant known configurations will be omitted if it is determined that such description may make the technical idea of the present invention unclear or obscure.

Figure 1:
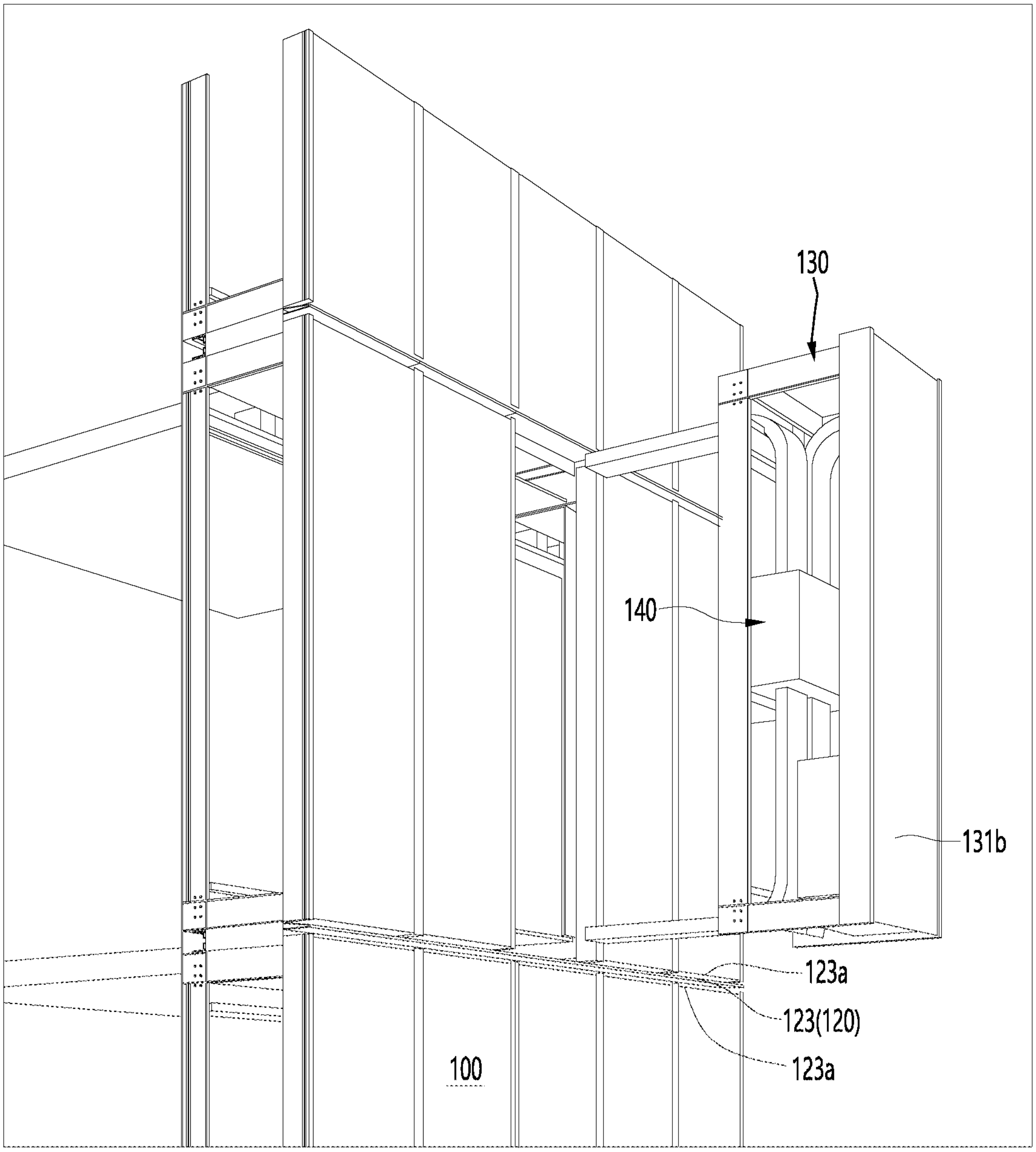
FIG. 1 is a conceptual diagram a multipurpose building envelope structure of the present invention.
Figure 2:
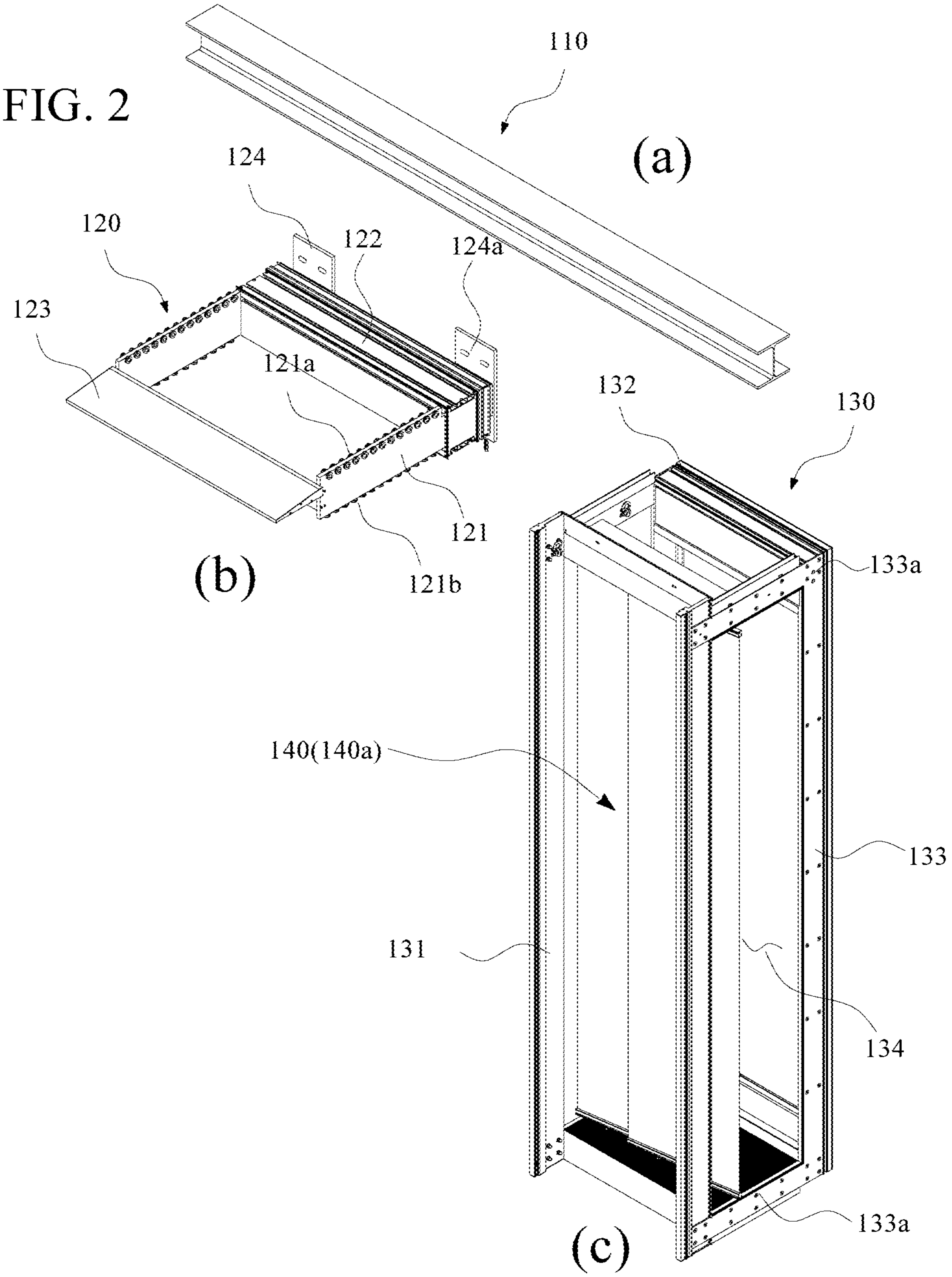
FIG. 2 is an exploded perspective view of the envelope structure.

FIG. 1 illustrates a state where one of exterior enclosures 130 is detached from an exterior structure 100 to explain the concept of a multipurpose building envelope structure (simply referred to as 'building envelope structure'), and FIG. 2 illustrates a support frame, a guide frame 120, and an exterior enclosure 130 to form the envelope structure.

The building envelope structure of the present invention is designed so that cubic exterior enclosures 130 are continuously installed to form a single exterior structure 100. However, each exterior enclosure 130 making up the exterior structure 100 can be independently detached and extracted outwardly in a drawer-like manner as illustrated in FIG. 1, and the extracted exterior enclosure 130 can be reinserted into the exterior structure 100 in the drawer-like manner. Additionally, technical infrastructure cartridges such as an electric louver cartridge 140*a*, air conditioning cartridge 140*b*, and various infrastructure function cartridges for environmental control of an architectural space are mounted inside the exterior enclosure 130 to enhance or change functions of the building or create various appearances.

Accordingly, the building envelope structure of the present invention allows only the cartridges 140 within the internal space to be replaced while extracting and inserting the exterior enclosure 130 from and into the exterior structure 100, thereby providing a multipurpose envelope structure that can add or enhance facility functions in response to users' demands, unlike the conventional concepts considering only uniform daylighting or ventilation.

The building envelope structure of the present invention includes the support frame 110, the guide frame 120, and the exterior enclosure 130 illustrated in FIG. 2.

The support frame 110 illustrated in FIG. 2*a* is installed on a structure of the building to support the load from the exterior enclosure 130, and the guide frame 120 protrudes outwardly from the building to guide the extraction and insertion of the exterior enclosure 130.

The support frame 110 can be installed during the construction of a new building or added to the outer wall of the existing building.

The guide frame 120 supports the exterior enclosure 130 from below and allows the exterior enclosure 130 to be detached from adjacent exterior enclosures 130 and extracted and inserted in the drawer-like manner as described above. The guide frame 120 is sufficient if the exterior enclosure 130 can be extracted and inserted in the drawer-like manner. For instance, as illustrated in FIG. 2*b*, the guide frame 120 includes a pair of vertical guide members 121, a connection bar 122 which connects the pair of vertical guide members 121 from the rear, a rectangular opening which is formed vertically, and a support plate (not shown) which is installed at the opening. In this instance, it is preferable that the support plate is installed to be detachable to allow versatility in replacing cartridges 140.

The description of the present invention is based on the embodiment illustrated in FIG. 2(*b*) for convenience.

The bottom and top surfaces of the enclosure are located on upper and lower portions of the vertical guide member 121, and guide rollers may be further installed at the upper and lower portions of the vertical guide member 121, facilitating precise and smooth extraction and insertion of the enclosure.

At this time, the upper portion of the vertical guide member 121 is in contact with the bottom surface of the exterior enclosure 130, and the lower portion comes close to the top surface of the exterior enclosure 130. The guide roller installed at the upper portion of the vertical guide member 121 is a vertical roller 121*a* which rotates in the vertical direction, and the guide roller installed at the lower portion is a horizontal roller 121*b* which rotates horizontally.

Additionally, an exterior strip 123 can be installed in front of the vertical guide member 121.

The exterior strip 123 finishes a wide space formed between the exterior enclosures 130 positioned at the upper and lower portions to enhance the appearance, and an air circulation opening 123*a* is formed between the exterior strip 123 and the exterior enclosure 130 to communicate with the interior of exterior enclosure 130. In this instance, the top surface of exterior strip 123 is inclined downward outwardly to allow dust or water that has entered the interior of the exterior enclosure 130 to be discharged outside, and a water stop groove (not shown) can be further formed on the bottom surface to prevent rainwater from seeping into the interior of the exterior enclosure 130 during the rainy season.

The exterior enclosure 130, which accommodates the cartridges 140 having required functions and is placed on guide frame 120, forms the exterior of the building, and is installed to be extracted from and inserted into the guide frame 120 in a drawer-like manner. As illustrated in FIG. 2*c*, the exterior enclosure 130 includes an exterior frame 131 located at the front, a fixed frame 132 located behind and spaced from the exterior frame 131, and a connection frame 133 located laterally and connecting the exterior frame 131 and the fixed frame 132.

The exterior frame 131 is located at the outermost portion of the building envelope structure of the present invention, and a fixed finishing member 131*a*, such as glass, or a kinetic facade cartridge 140*c* can be installed inside the exterior frame 131.

The fixed frame 132 is located on the indoor side of the building envelope structure of the present invention, and an administrator access window, a smoke vent, a fixed insulated glass, and a cartridge inspection panel may be installed inside the fixed frame 132.

The connection frame 133 connects the exterior frame 131 and the fixed frame 132 to form a space for accommodating the cartridge 140, but must be formed integrally with the adjacent exterior enclosures 130 to form the exterior structure 100 or to be separated from the exterior structure 100 and must be configured to be able to be attached to and detached from the adjacent exterior enclosure 130. For example, the connection frame 133 has connection holes 133*a* to enable attachment and detachment of the exterior enclosure 130 to and from the adjacent exterior enclosure 130 through the fastening and release of bolts.

Additionally, the connection frame 133 has an insertion opening 134 to allow the removal of the cartridges 140 housed inside the exterior enclosure 130 or the insertion of a new cartridge 140.

Rails 135 can be further installed on the bottom surface of the exterior enclosure 130, which includes the exterior frame 131, the fixed frame 132, and the connection frame 133. The rails 135 are placed on the top surface of the vertical guide member 121 or on the vertical roller 121*a* installed on the vertical guide member 121 to enable stable back-and-forth sliding of the exterior enclosure 130.

The building envelope structure of the present invention can be constructed by a method of sequentially performing the steps of installing brackets 111 on the support frame 110 installed on the structure of the building to transmit the load of the exterior enclosure 130 to the structure of the building in safety, fixedly installing the guide frame 120 to the support frame 110 using the bracket 111, and installing the exterior enclosure 130 to the guide frame 120, or constructed by a method of performing the steps of fixing the guide frame 120 to the bottom surface of the exterior enclosure 130 and fastening and fixing the guide frame 120 to the support frame 110.

Figure 3:
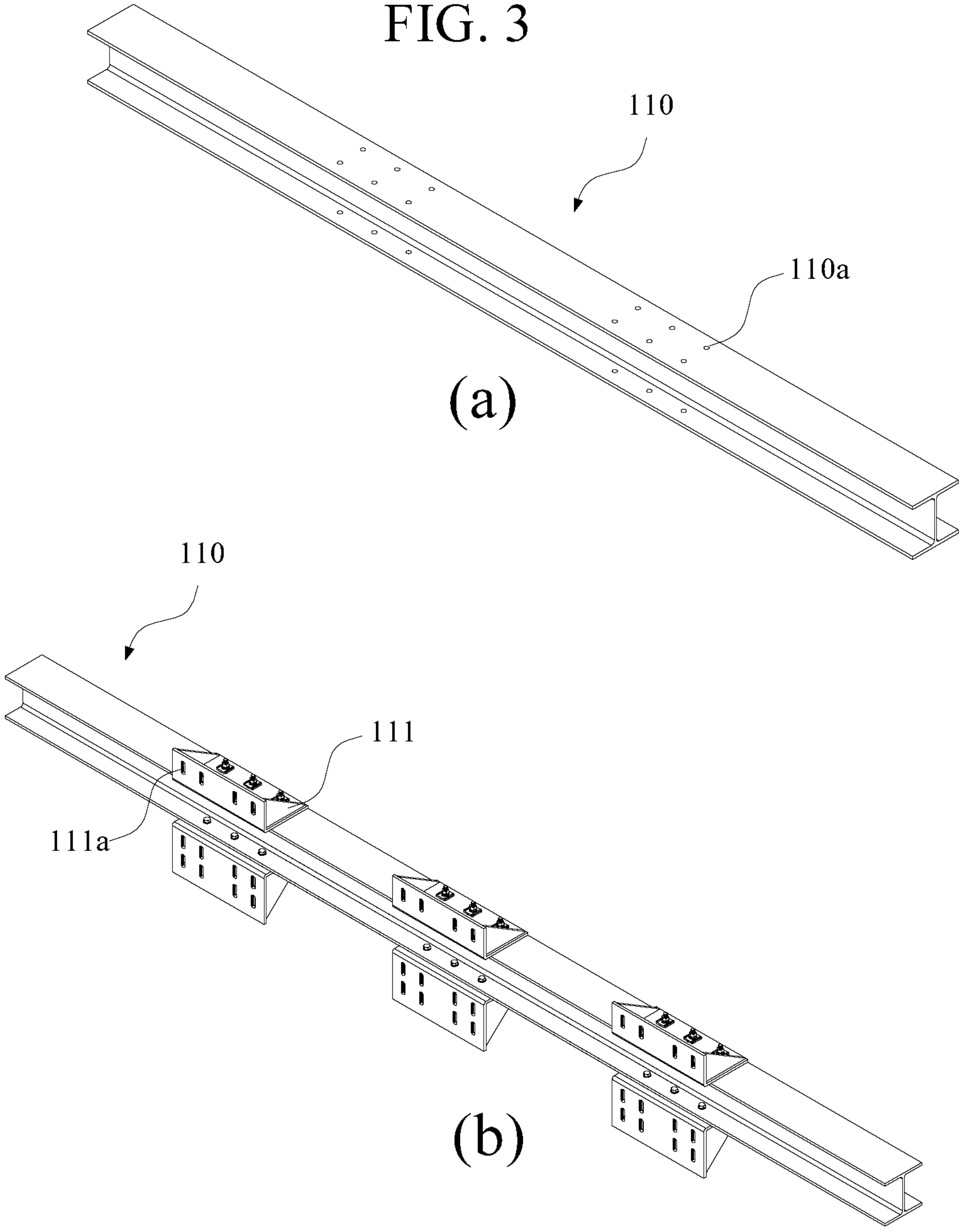
FIGS. 3 to 5 are views for depicting the process of constructing the envelope structure on a building.
Figure 4:
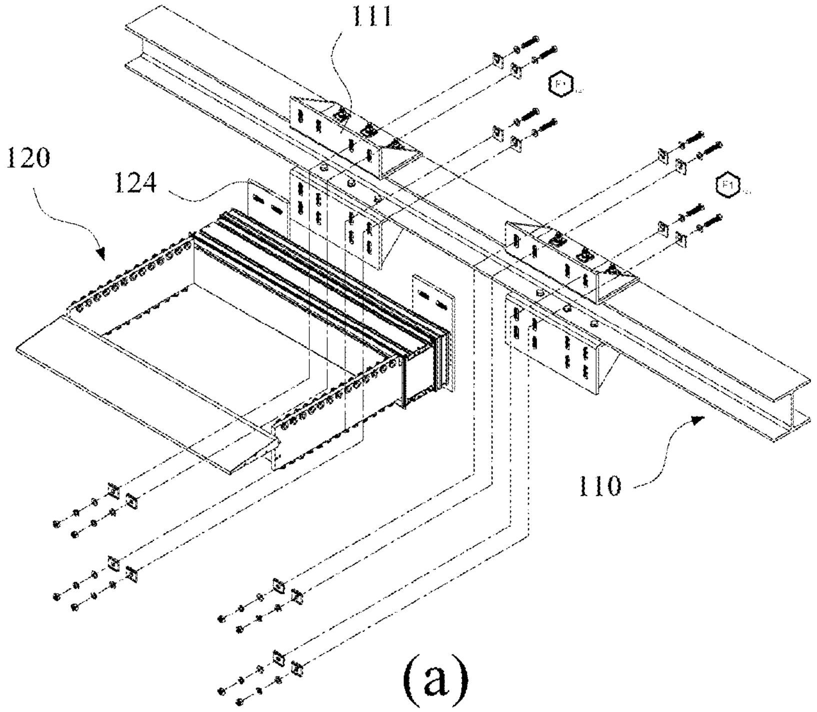
Figure 4:
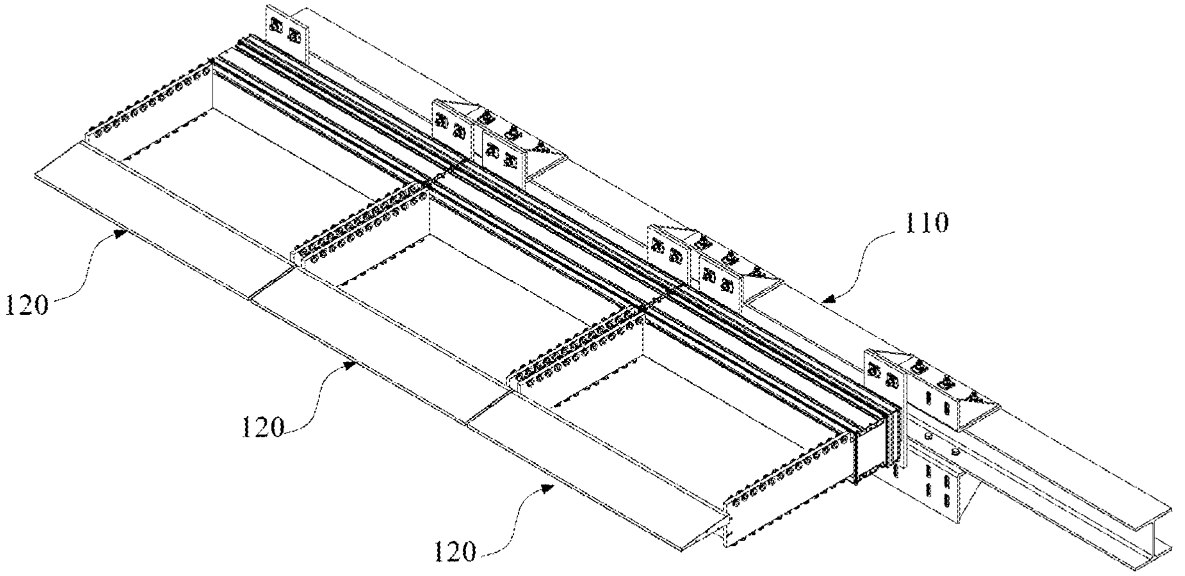
Figure 5:
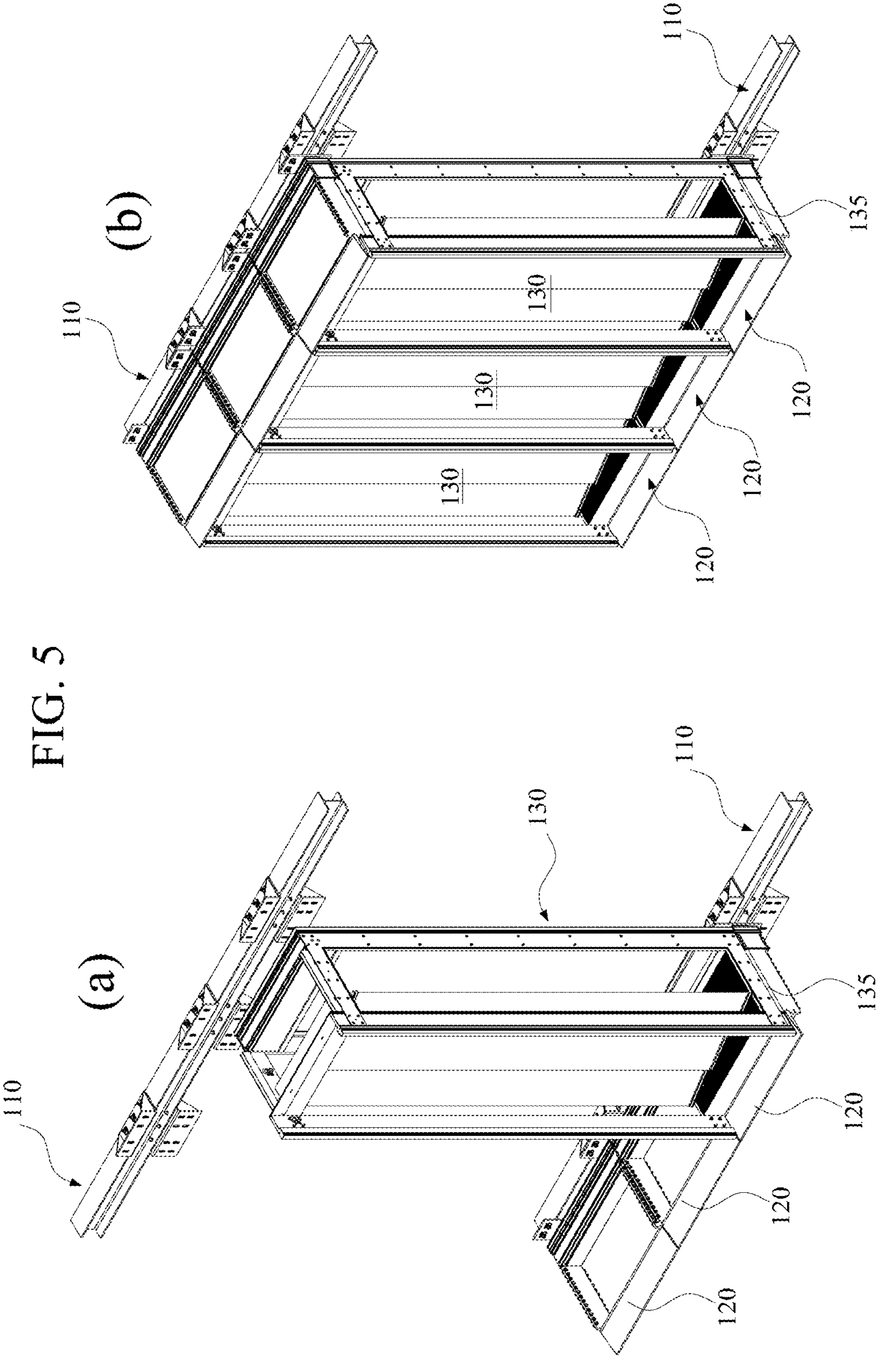

For instance, the former method is used for lower floors, particularly the first floor, and the latter method is used for floors above the second floor, which require lifting, to ensure the safety of the work. FIGS. 3 to 5 illustrate each step of the former method of forming the envelope structure on the building.

FIG. 3 illustrates installing the bracket 111 on the support frame 110 for fixing the guide frame 120.

As illustrated in FIG. 3*a*, fastening holes 110*a* are preformed on the support frame 110 for installing the bracket 111.

The fastening holes 111*a* of the bracket 111 corresponding to the fastening holes 110*a* of the support frame 110 are elongated in the back-and-forth direction to easily correct any construction errors in coupling the support frame and the bracket. Additionally, the bracket 111 must have fastening holes 111*b* for coupling with the guide frame 120, which are also elongated in the vertical direction to facilitate the correction of construction errors during coupling with the guide frame 120.

FIG. 3*b* illustrates a method of installing the bracket 111 on the support frame 110. As illustrated in the drawing, the bracket 111 is installed on the upper and lower surfaces of the support frame 110.

FIG. 4 illustrates the installation of the guide frame 120 on the support frame 110.

As illustrated in FIG. 4*a*, the guide frame 120 may further include a joining piece 124 having fastening holes 124*a* for bolt coupling with the bracket 111 installed on the support frame 110.

FIG. 4*b* illustrates a state in which the plurality of guide frames 120 are continuously installed on the support frame 110 using the method of bolt-coupling the joining piece 124 to the bracket 111.

FIG. 5 illustrates the final step of forming the building envelope structure of the present invention, which installs the exterior enclosure 130 on the guide frame 120 fixed to the support frame 110.

As illustrated in FIG. 5*a*, the exterior enclosure 130 is lifted by lifting means such as a crane and mounted on the top surface of the guide frame 120, the bottom of the exterior enclosure 130 is fixed on the guide frame 120 and the top is fixed to the bracket 111 installed on the bottom surface of the support frame 110 located on the upper floor, thus maintaining structural stability.

FIG. 5*b* illustrates a state in which the plurality of exterior enclosures 130 are continuously installed to complete the construction of the exterior structure 100.

As described above, the cartridge 140 accommodated inside the exterior enclosure 130 are replaced with a new cartridge 140 after the exterior enclosure 130 is extracted from the exterior enclosure 130 in the drawer-like manner. FIGS. 6 to 9 illustrate each step of the method. Referring to the drawings, the method for changing the function of the building envelope will be described in detail as follows.

Figure 6:
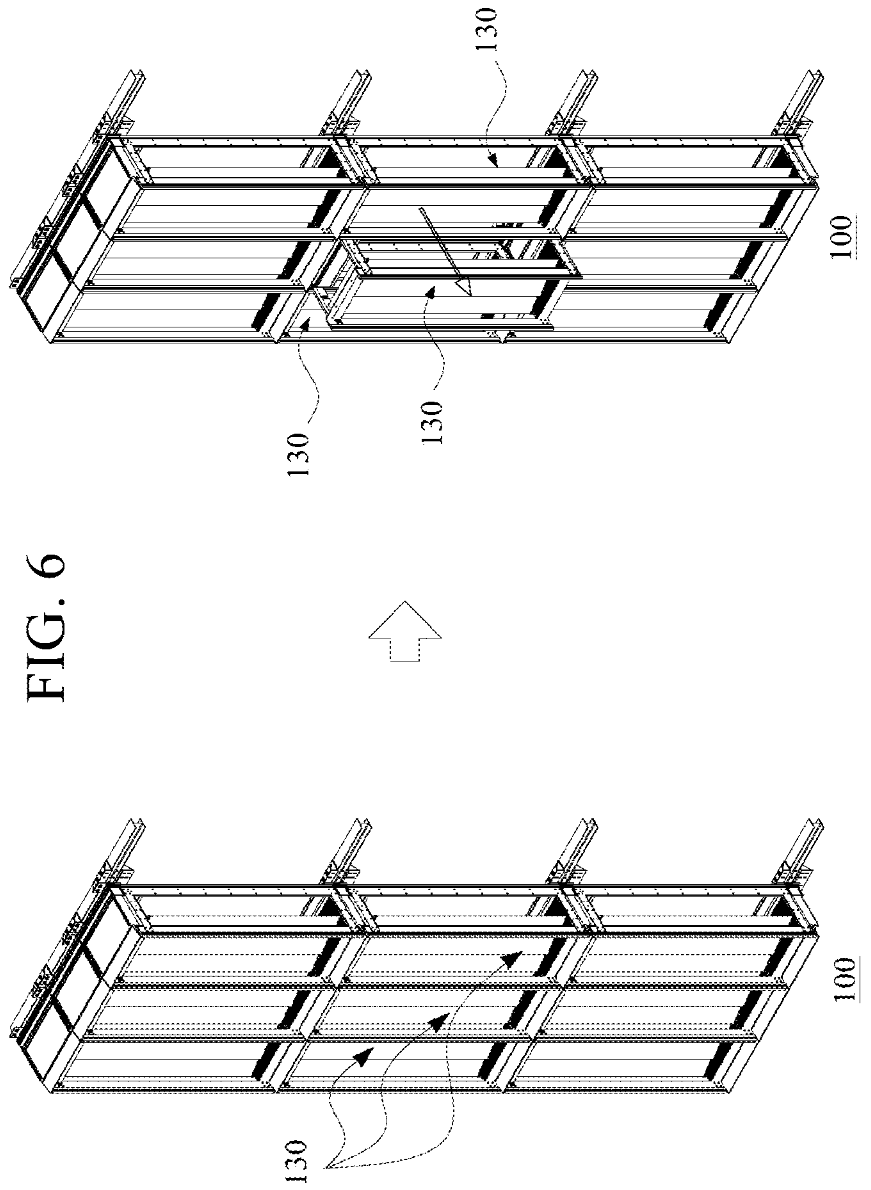
FIGS. 6 to 9 are explanatory diagrams illustrating a method for changing the function of the envelope structure according to an embodiment of the present invention.

As illustrated in FIG. 6, first, the exterior enclosure 130 (referred to as a 'target exterior enclosure' to distinguish from other exterior enclosures) to change the function of the cartridge 140 accommodated therein is detached and extracted from the exterior structure 100.

The connection frame 133 located on the side of the target exterior enclosure 130 is detached from the adjacent exterior enclosure 130, and the top and bottom of the target exterior enclosure 130 are detached from the support frame 110 and the guide frame 120, allowing the target exterior enclosure 130 to move freely on the top surface of the support frame 110. In this instance, necessary precautions are taken to prevent the detached target exterior enclosure 130 from sliding unexpectedly from the exterior structure 100.

When the target exterior enclosure 130 is detached from the exterior structure 100, the target exterior enclosure 130 slides on the guide frame in the drawer-like manner to be extracted outward from the exterior structure 100.

Figure 7:
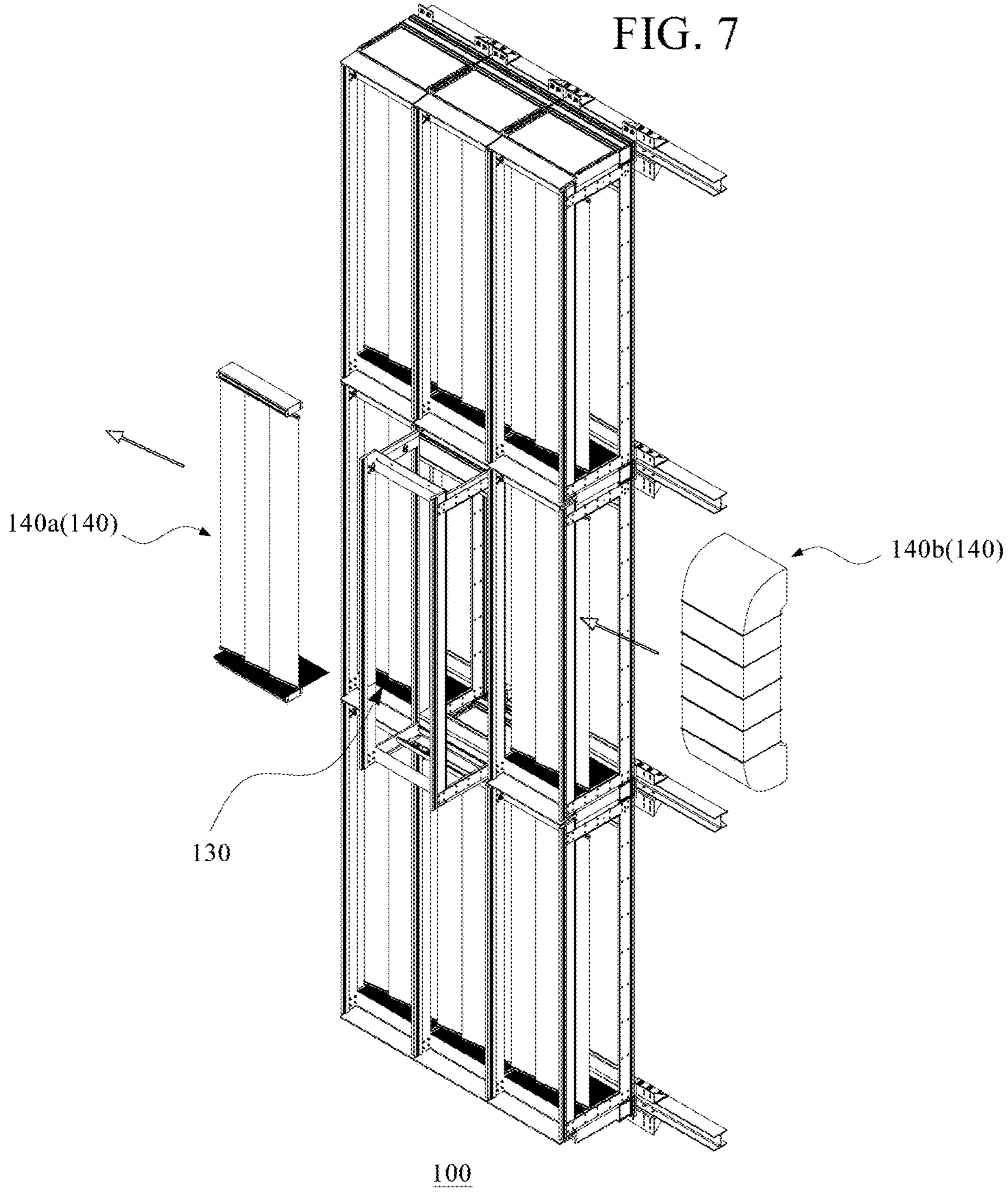

Next, as illustrated in FIG. 7, the cartridge 140 previously housed inside the extracted target exterior enclosure 130 is removed, and a new cartridge 140 with a new function is inserted into the target exterior enclosure 130.

Figure 8:
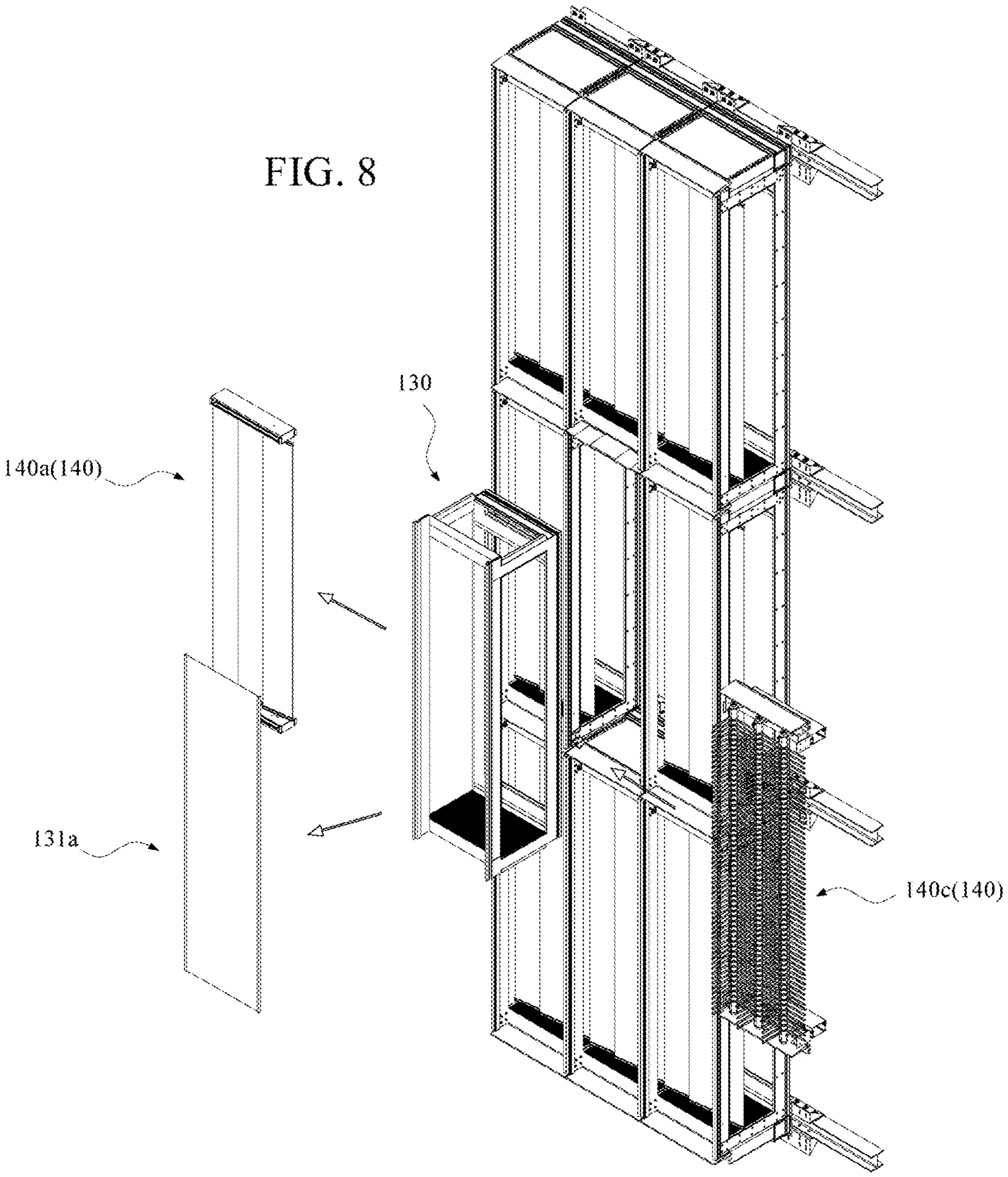

Of course, as described above, the kinetic facade cartridge 140*c* can be installed in the exterior frame 131 through the replacement of cartridge 140. In this case, the glass 131*a* previously installed inside the exterior frame 131 is removed along with the cartridge 140 to be replaced, and the kinetic facade cartridge 140*c* is installed in the exterior frame 131. FIG. 8 illustrates a state in which the electric louver cartridge 140*a* installed in the exterior enclosure 130 and the glass 131*a* as the exterior finish member are removed and the kinetic facade cartridge 140*c* is installed.

Figure 9:
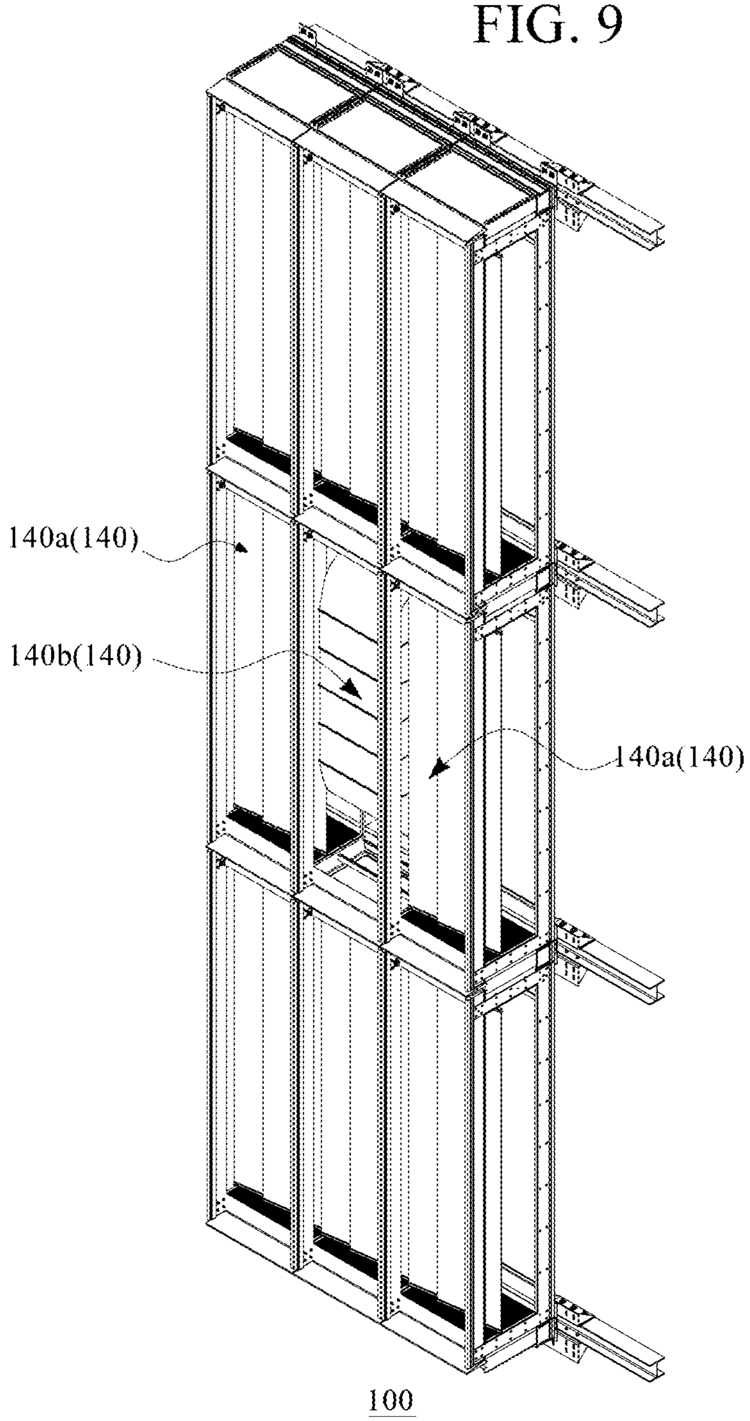

When the replacement of the cartridge 140 is completed, the target exterior enclosure 130 is slid on the guide frame 120 to be inserted into the exterior structure 100 in the drawer-like manner, and then the exterior structure 100 is fixed to the support frame 110 located above, the guide frame 120 located below, and the exterior enclosures 130 located laterally. The replacement of the cartridge 140 in the target exterior enclosure 130 enables the building to enhance existing functions or add new functions. FIG. 9 illustrates the state in which the cartridge 140 is replaced in the target exterior enclosure 130.

Meanwhile, if the extraction work of the target exterior enclosure 130 occurs in mid-air, there is a risk of an accident due to falling of the target exterior enclosure 130.

Figure 11:
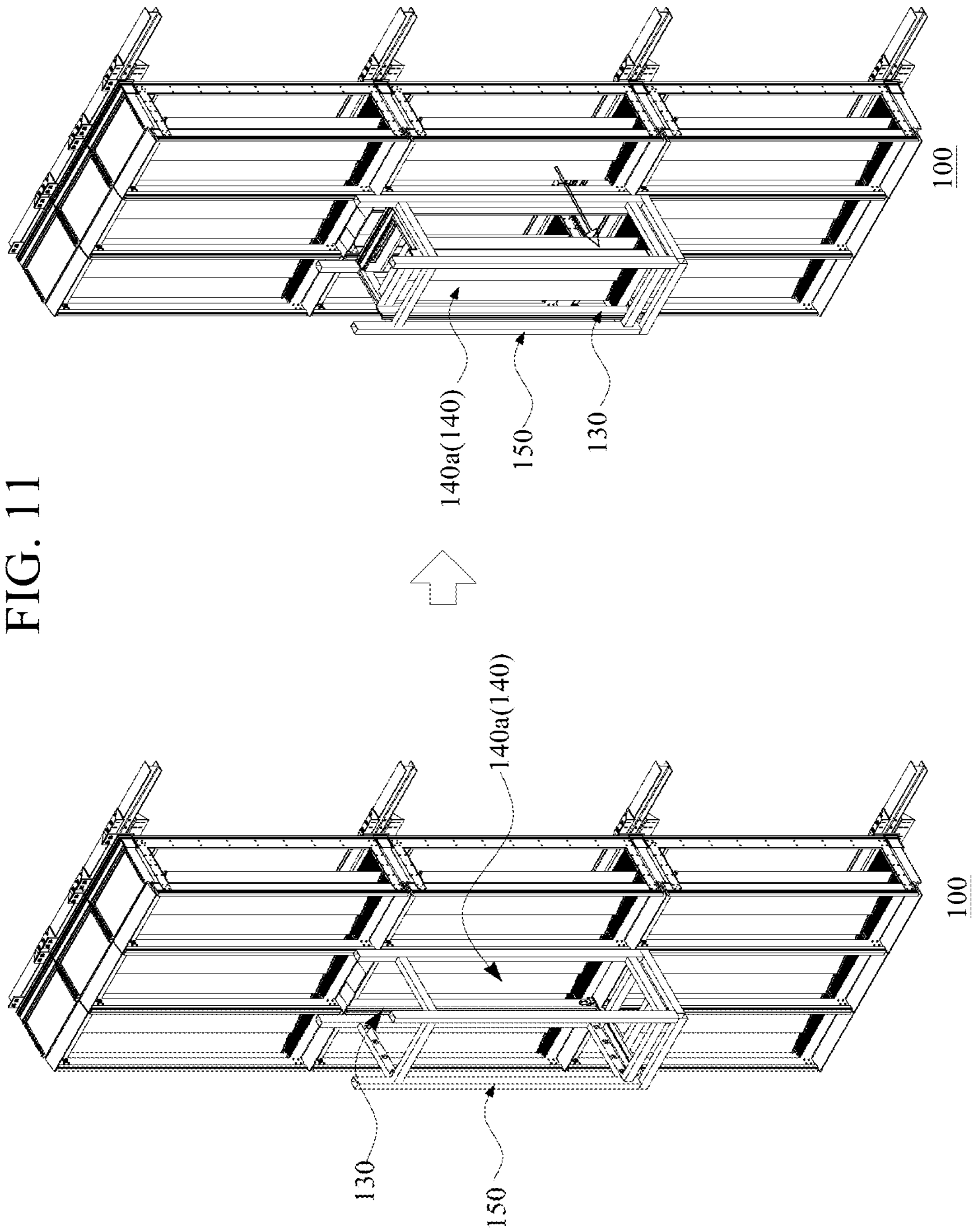
FIGS. 11 and 12 are explanatory diagrams illustrating changes in function of the envelope structure using the temporary enclosure.
Figure 12:
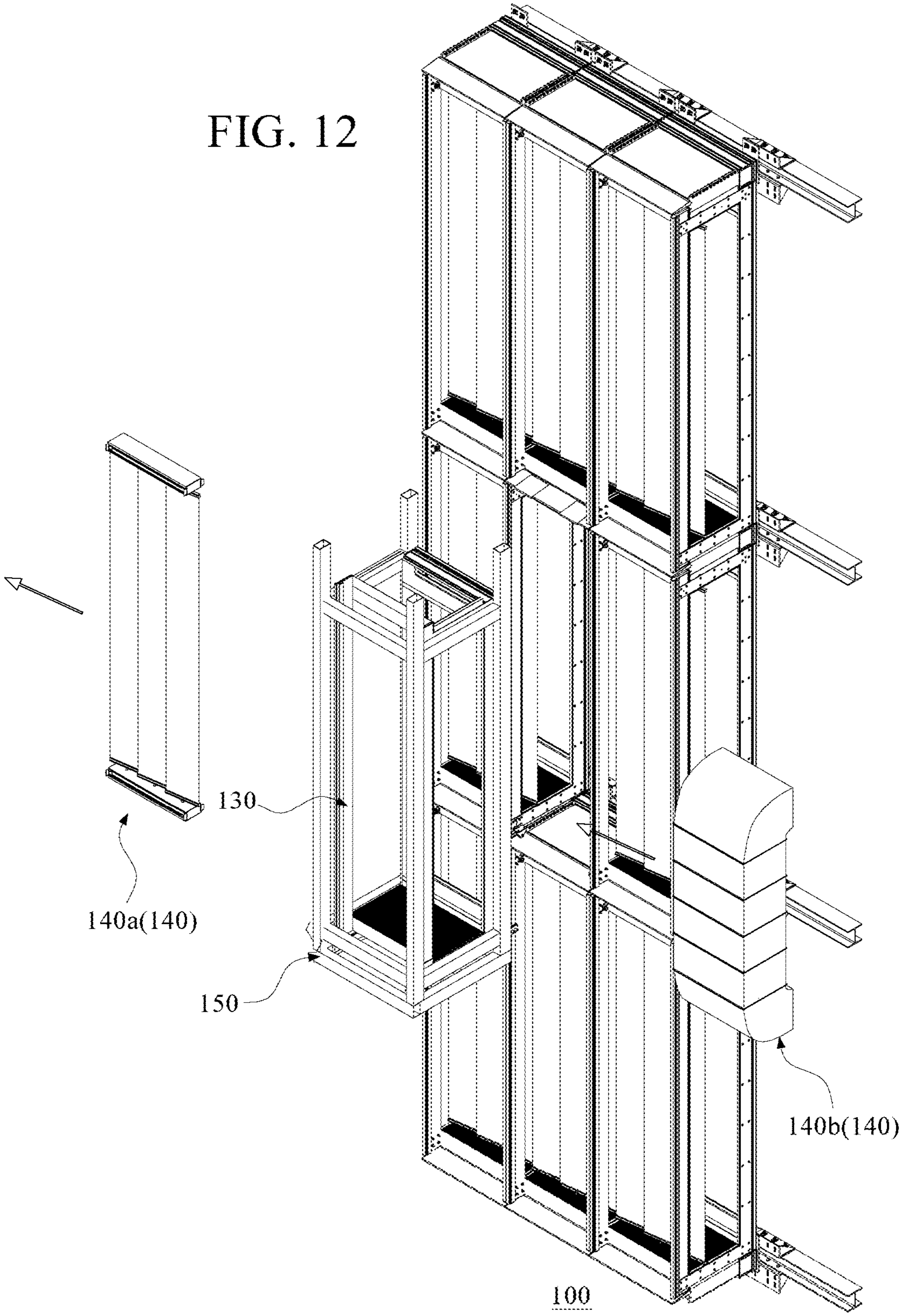

Therefore, in another embodiment of the present invention, when the target exterior enclosure 130 is extracted to the outside of the exterior structure 100, as illustrated in FIGS. 11 and 12, a temporary enclosure 150 is placed in front of the target exterior enclosure 130 to be temporarily fixed to the exterior structure 100, and the target exterior enclosure 130 is detached from the exterior structure 100 and is inserted into the temporary enclosure 150, thereby solving the safety issues.

The replacement of the cartridge 140 inside the target exterior enclosure 130 can be achieved at the position where the target exterior enclosure 130 has been inserted into the temporary enclosure 150, or can be achieved on the ground by lowering the temporary enclosure 150 containing the target exterior enclosure 130.

Figure 10:
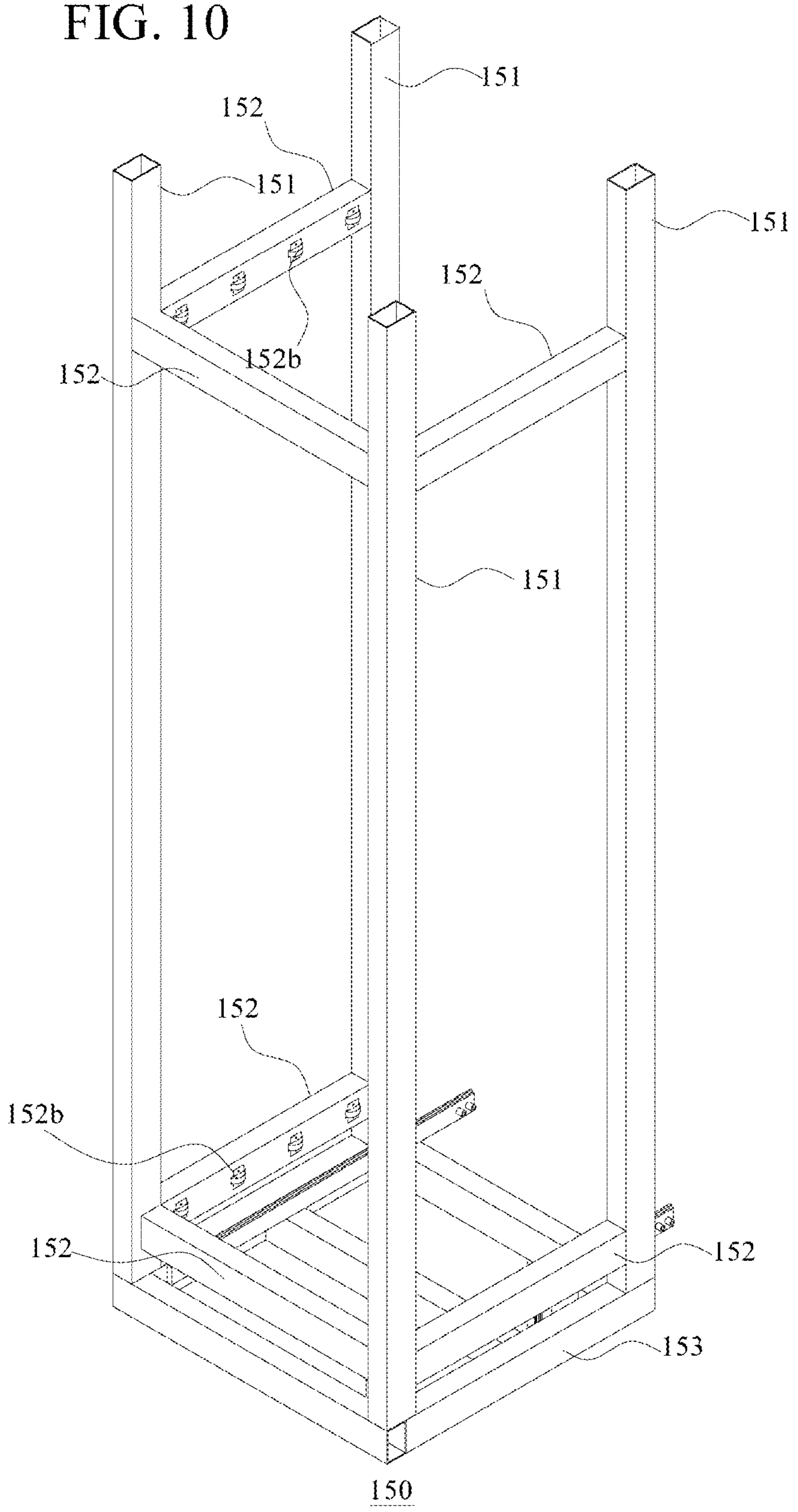
FIG. 10 is a perspective view of a temporary enclosure according to an embodiment of the present invention.

The temporary enclosure 150 must be configured to have an internal space capable of accommodating the target exterior enclosure 130 and can have various shapes. However, in the most preferred embodiment, as illustrated in FIG. 10, the temporary enclosure 150 includes vertical bars 151 installed at each corner of a rectangular cross-section which can accommodate the target exterior enclosure 130, a bottom frame 153 located at the bottom of the vertical bars 151, and a separation prevention 152 connecting the vertical bars 151 to prevent the target exterior enclosure 130, which is being inserted into the exterior enclosure 130, or the fully inserted exterior enclosure 130 from getting out of the temporary enclosure 150 during the insertion process.

Therefore, the separation prevention frame 152 must be located below the height of the target exterior enclosure 130 placed in the temporary enclosure 150. In this instance, the single separation prevention frame 152 may be positioned at the mid-height of the target exterior enclosure 130, preferably, installed at the upper and lower portions as illustrated in FIG. 10.

Additionally, since the target exterior enclosure 130 must be inserted into the temporary enclosure 150. The separation prevention 152 connects only between the vertical bars 151 excepting between the pair of vertical bars 151 located inside, thus forming a U-shaped configuration.

The separation prevention frame 152 includes horizontal rollers 152*b* provided on the inner surface of the lateral side thereof to facilitate smooth entry of the target exterior enclosure 130 into the temporary enclosure 150.

The bottom frame 153 structurally integrates the vertical bars 151 to support the inserted target exterior enclosure 130. Although not illustrated, the vertical bars 151 can be integrated at the top to maintain a more stable structural form of the temporary enclosure 150.

As described above, while the present invention has been described in detail with reference to specific embodiments, the examples are only to facilitate understanding of the present invention, and it is evident to those skilled in the art that various modifications can be made within the scope of the technical concept of the present invention without departing from the scope defined in the claims. Therefore, such modifications are considered to fall within the scope of the present invention.

INDUSTRIAL APPLICABILITY

The present invention can enhance the function of the building or easily change the function of the building according to a user's needs by changing the function of the building envelope, thereby increasing the durability and value of the building.

The invention claimed is:

1. A method for changing a building envelope function using a multipurpose building envelope structure, which includes: a support frame installed on a structure of a building; a guide frame protruding outwardly from the support frame; and an exterior enclosure forming the exterior of the building and installed on the guide frame in a drawer-like manner, the method comprising the steps of:

a) detaching, from an exterior structure, a target exterior enclosure to be changed in function;

b) sliding the target exterior enclosure on a guide frame and extracting out of the exterior structure in a drawer-like manner;

c) removing a cartridge inside the target exterior enclosure and inserting a new cartridge having a new function; and d) sliding the target exterior enclosure on a guide panel to insert into the exterior structure in the drawer-like manner and inserting the target exterior enclosure back into the exterior structure by sliding the target exterior enclosure, like a drawer, along the guide panel, and performing the steps in sequence.

2. The method according to claim 1, wherein the step b) includes:

placing a temporary enclosure in front of the target exterior enclosure to be extracted, and inserting the target exterior enclosure into the temporary enclosure.

3. The method according to claim 2, wherein the temporary enclosure comprises:

vertical bars which are installed at each corner of a rectangular cross-section which can accommodate the target exterior enclosure;

a bottom frame which integrates the vertical bars and supports the positioned target exterior enclosure; and a U-shaped separation prevention frame which connects between the vertical bars excepting between a pair of vertical bars located inside, thus forming a U-shaped configuration.

4. The method according to claim 3, wherein the separation prevention frame is positioned below the height of the target exterior enclosure placed within the temporary enclosure.

5. The method according to claim 3, wherein the separation prevention frame includes horizontal rollers provided on an inner surface of a lateral side thereof.

* * * * *